US008085675B2

(12) United States Patent
Hoque et al.

(10) Patent No.: US 8,085,675 B2
(45) Date of Patent: Dec. 27, 2011

(54) METHOD AND APPARATUS TO TEST A DATA PATH IN A NETWORK

(75) Inventors: Mohammed Mokammel Hoque, San Jose, CA (US); Ulf Axel Niklas Ströberg, Sunnyvale, CA (US); Richard C. Wang, Hillsborough, CA (US)

(73) Assignee: Cisco Technology, Inc., San Jose, CA (US)

( * ) Notice: Subject to any disclaimer, the term of this patent is extended or adjusted under 35 U.S.C. 154(b) by 523 days.

(21) Appl. No.: 11/379,530

(22) Filed: Apr. 20, 2006

(65) Prior Publication Data

US 2007/0248020 A1    Oct. 25, 2007

(51) Int. Cl.
*G01R 31/08* (2006.01)

(52) U.S. Cl. ...................................................... 370/249

(58) Field of Classification Search .......... 370/200–253, 370/272–309, 431–546, 404–411, 424–427, 370/460–464
See application file for complete search history.

(56) References Cited

U.S. PATENT DOCUMENTS

| | | | | |
|---|---|---|---|---|
| 4,059,729 A * | 11/1977 | Eddy et al. | ..................... | 370/249 |
| 4,279,032 A * | 7/1981 | Smith | ........................... | 370/249 |
| 5,784,558 A * | 7/1998 | Emerson et al. | .............. | 709/230 |
| 6,571,359 B1 * | 5/2003 | Padwekar et al. | ............... | 714/40 |
| 2003/0048781 A1 * | 3/2003 | Pierson | ......................... | 370/389 |

* cited by examiner

*Primary Examiner* — Pao Sinkantarakorn
*Assistant Examiner* — Iqbal Zaidi
(74) *Attorney, Agent, or Firm* — Schwegman, Lundberg & Woessner, P.A.

(57) ABSTRACT

A method and apparatus for testing a data path in a network is described. The method may comprise creating a closed loop in the data path so that test data (e.g., fixed set of known data) sent from a local network device to a downstream network device is returned by the downstream network device. Thereafter, the test data is injected into the closed loop and selectively extracted from the loop. The test data may then be processed. The method may create the closed loop by closing a first loopback mechanism at the local network device and closing a second loopback mechanism at the downstream network device. In an example embodiment, the method determines whether the identified errors exceed a threshold number of errors. The method may be utilized to determine if fiber connectivity of the data path has failed when the identified errors exceed the threshold.

25 Claims, 8 Drawing Sheets

METHOD AND APPARATUS TO TEST A DATA PATH IN A NETWORK

FIELD

This invention is related to the field of network communication. In an example embodiment, a method and device is provided to test network connectivity.

BACKGROUND

To determine whether a connection exists between two devices attached to a network, the network connection needs to be tested. Often, the two devices are geographically separated. If the two devices fail to properly communicate with each other, the failure may be caused by a problem in one or both of the devices or it may be caused by a problem with the network connection. To determine whether the network connection is operating properly, the connection needs to be inspected. However, the physical length of the network often prevents a manual inspection of the connection. For example, if one device is located in North America, and the other is in Australia, then manually examining the network connection for a failure is not possible. Therefore, there is a need to test a network connection without performing a manual inspection.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method utilizes flow controllable buffers and a switchable loopback mechanism or device in a data traffic path to implement a relatively inexpensive line rate test of down stream traffic path. The principle of an example method is that a fixed amount of deterministic data traffic is injected in to a transmit path and transmitted downstream to an arbitrary remote point where it is looped back in a receive path. Once the data returns to the point where it was injected, it is looped back from the receive path to the transmit path and sent down stream again. This loop may be maintained for a specified amount of time, after which the re-transmission ceases and the returning traffic is allowed to fill up a receiving buffer that can accommodate the entire amount of data that was originally injected into the network. For the purposes of this application the term "buffer" is intended to include any memory or storage device. It will be appreciated that the size of the buffer may be dependent upon the size of the loop. For example, more buffer space may be needed on a transmitter card which guarantees that the path is fully loaded when the packets are flowing back and forth through the path. The required buffer size to keep the path fully loaded may be a function of the round-trip-time (RTT, which includes any lag in intermediate nodes) and the transmission data rate for the data path.

When no more of the injected data is received and the traffic path under test has been drained, the data in the receiving buffer is compared to the originally injected, deterministic data. Other system specific traffic flags and statistics may also be verified using this example method. Because a fixed data set is looped around for the duration of a test, transmission errors may accumulate in the data set, and thus circumstances may arise where only a fraction of the total data injected is subsequently captured and compared.

An example embodiment may be protocol independent as long as transmit and receive packets remain the same. When, for example, deployed in an example router or any network device, fixed packets may be programmed into a sender/master card or module (as opposed to a network processor). Any header may be pre-pended before these packets go out of the sender card. A receiver port on the master card where the packets originated, may remove any additional header that was needed for sending the packets out of the sender card. Thus, in an example embodiment, the sender card may be the master and need not depend on the network processor which may slow down transmission. As the master card may generate its own packet (e.g., test data or packets may be stored on the card) performance may be enhanced when testing the path at line speed to check the quality of the whole loop. In an example embodiment, all receive and transmit error counters are captured and thus, analyzing the data may thus point to a failing area.

Figure 1:
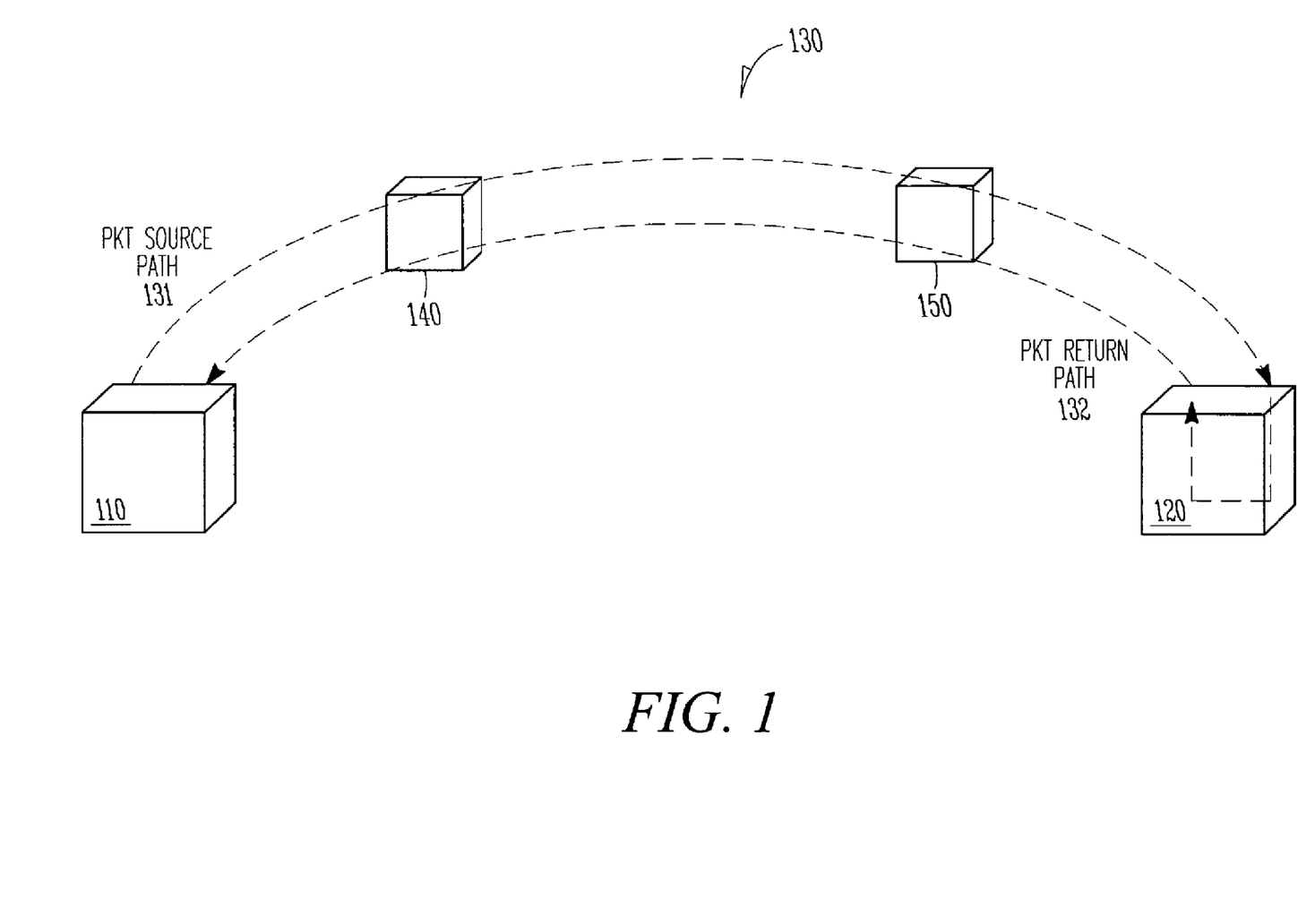
FIG. 1 shows an example of a network that can be tested using a switchable loopback mechanism, in accordance with an example embodiment.

FIG. 1 shows a network that can be tested using the switchable loopback mechanism, in accordance with an example embodiment. A local network device, such as first router 110, is connected to a downstream network device, such as second router 120, through a network 130, which is shown to include intermediate nodes 140 and 150. The network 130 includes a packet source path (or transmit path) 131 and a packet return path (or receive path) 132, and may provide fiber connectivity between routers 110 and 120.

Figure 2A:
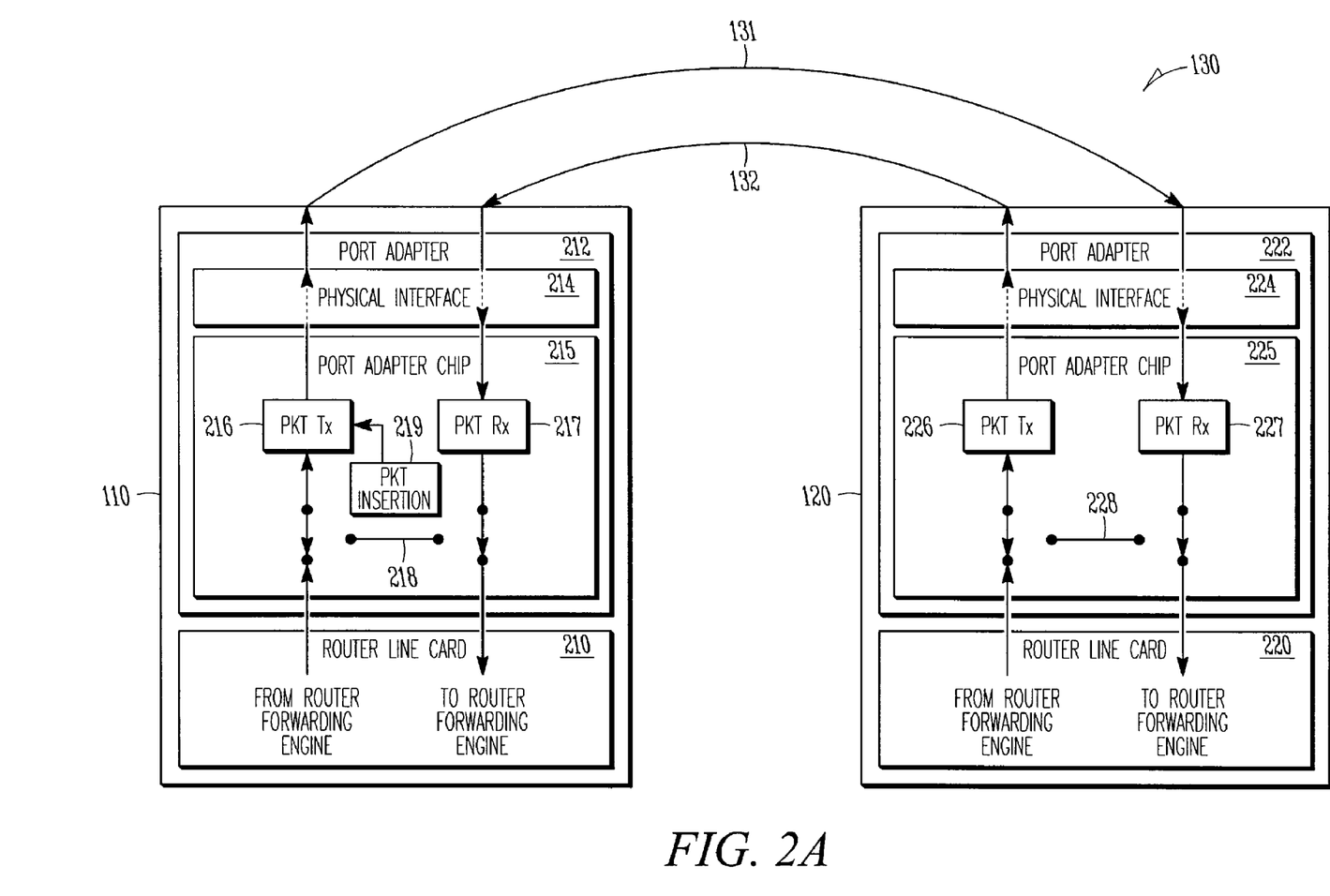
FIGS. 2A and 2B show an example of network routers that each includes a switchable loopback mechanism, in accordance with an example embodiment.
Figure 2B:
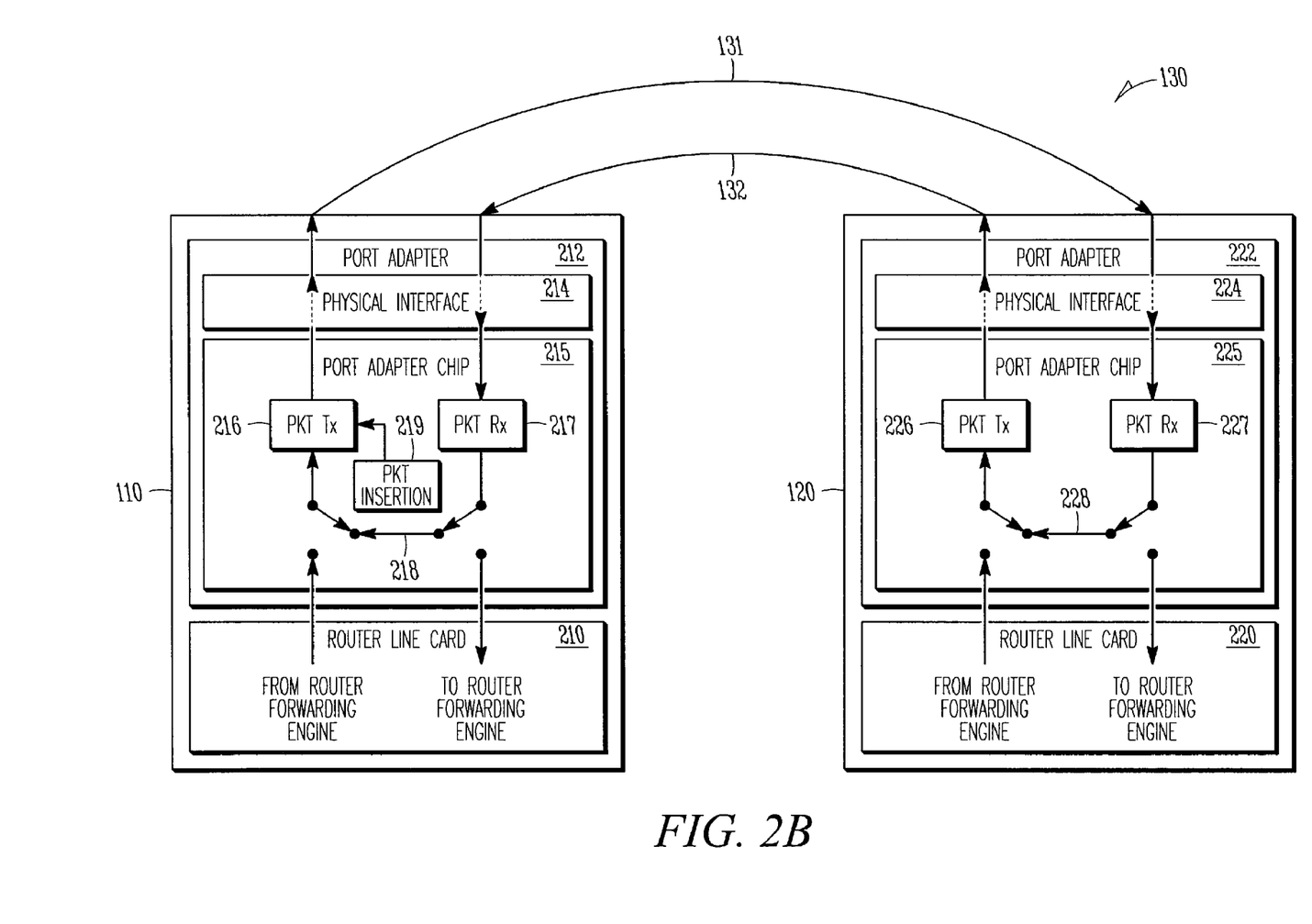

As shown in FIGS. 2A and 2B, the first router 110 is shown by way of example to include a router line card 210, which sends data packets from a router forwarding engine to a port adapter (also known as media adapter) 212 for transmission over the network 130. Also, data packets from the network 130 are received by the port adapter 212 and through a router line card 210 to the router forwarding engine.

The port adapter 212 may also include a physical interface 214 and a port adapter chip 215. The port adapter chip 215 includes a packet transmission buffer 216 for storing packets before they are transmitted through the physical interface 214 onto the network 130, a packet reception buffer 217 for storing packets received from the network 130 before sending them to a router line card 210, and a loopback mechanism 218. In a normal mode of operation when test data is not being injected into the data path 131, data is communicated from the router line card 210 into the packet transmission buffer 216 and data received by the packet reception buffer 217 is fed into the router line card 210 (see FIG. 2A).

However, as shown in FIG. 2B, when in loopback mode, the switchable loopback mechanism 218 disconnects the port adapter 212 from the router line card 210, so that packets are no longer sent from the network 130 to the router line card 210. Instead, a packet insertion mechanism or injection module 219 loads a fixed data set of test packets into the packet transmission buffer 216, which then sends the fixed data set of test packets through the physical interface 214 onto the network 130. The network 130 may be configured to provide fiber connectivity between the routers 110 and 120.

The router 120 is shown by way of example to include a router line card 220, which sends data packets from a router forwarding engine to a port adapter 222 for transmission over the network 130. Also, data packets from the network 130 are received by the port adapter 222 and sent through the router line card 220 to the router forwarding engine. The port adapter 222 may include a physical interface 224 and a port adapter chip 225. The port adapter chip 225 includes a packet transmission buffer 226 for storing packets before they are transmitted through the physical interface 224 onto the network 130, a packet reception buffer 227 for storing packets received from the network 130 before sending them to the router line card 220, and a switchable loopback mechanism 228. As in the case of the first router 110, in a normal mode of operation when test data is not being injected into the data path 131, data in the router 120 is communicated from packet reception buffer 227 to the router line card 220 and data from the router line card 220 is communicated to the packet transmission buffer 226 (see FIG. 2A).

However, when in loopback mode, the switchable loopback mechanism 228 disconnects the port adapter 222 from the router line card 220, so that packets are no longer sent from the network 130 to the router line card 220. Instead, packets received from the network 130 are stored in the packet reception buffer 227, then are loaded into the transmission buffer 226 through the loopback mechanism 228, and sent back onto the network 130 through the physical interface 224 (see FIG. 2B).

When the loopback mechanisms 218, 228 are closed, a test for fiber connectivity can be performed. During the test for fiber connectivity, the packets that are received by the router 120 are the fixed data set of test packets from packet insertion mechanism 219 that were sent by the router 110 over the network 130. The router 120, after receiving the fixed data set of test packets, sends them back to the router 110 over the packet return path 132 of the network 130. The router 110 then receives the fixed data set of test packets in the packet reception buffer 217. The router 110 can load the fixed data set of test packets from the reception buffer 217 in to the transmission buffer 216 using the loopback mechanism 218, and continue to loop the fixed data set for the duration of the test. The router 110 can also end the loopback testing method and examine the fixed data set of test packets in reception buffer 217 for any transmission errors that may have occurred. For example, if errors such as bit parity inline errors are present in the fixed data set of test packets, this may indicate that the test for fiber connectivity between router 110 and router 120 over network 130 has failed.

In an example embodiment the test path or loop is part of the regular traffic flow excluding the network processor and routing table. Thus, the sender and receiver cards may be isolated so traffic can continue to flow back and forth in the loop. The connection may be a point-to-point connection. A data flow path may be established from a master transmitter to a slave receiver which is configured to support loopback so all the packets are transmitted back to sending node.

Figure 3A:
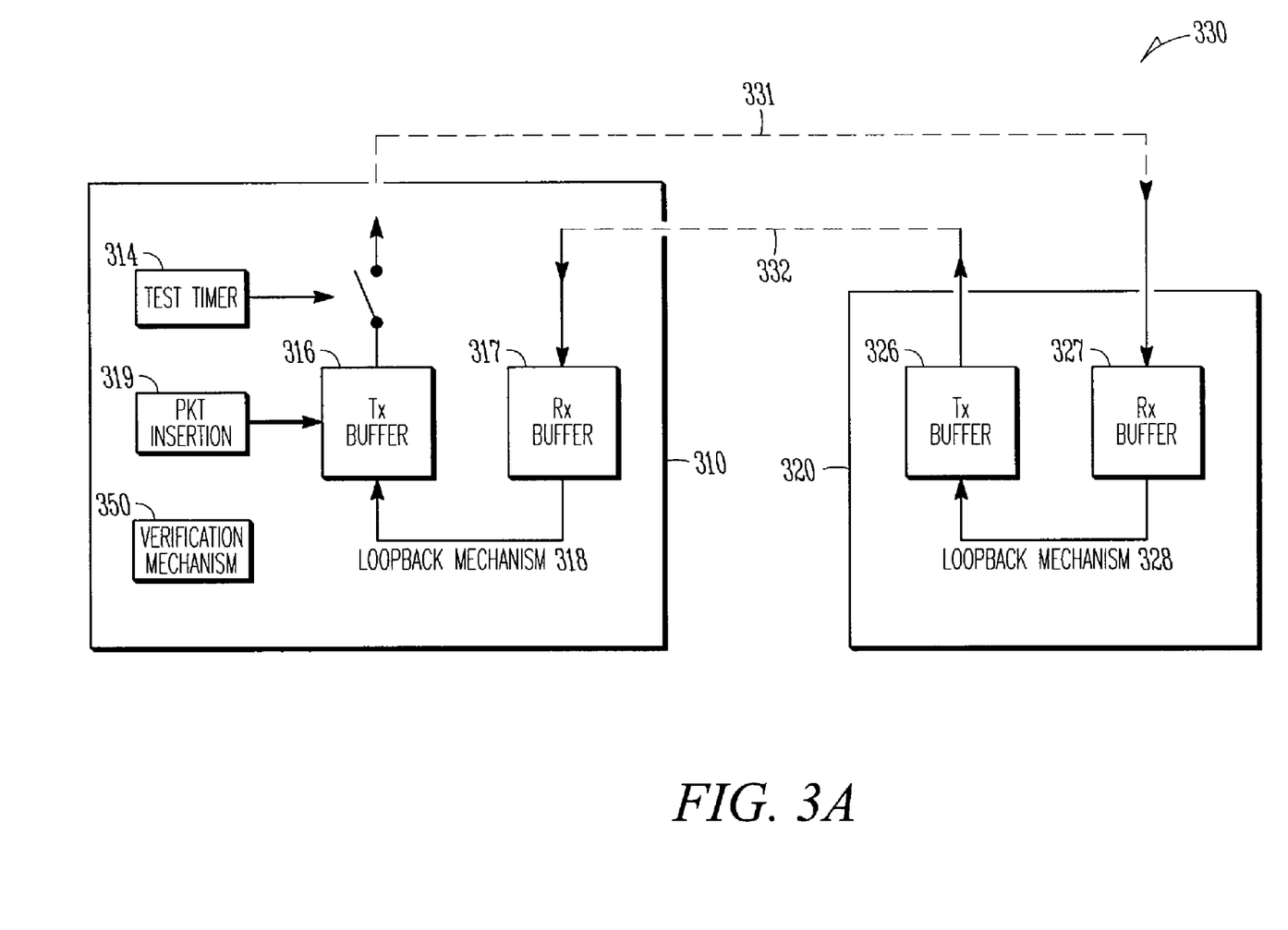
FIGS. 3A, 3B, and 3C show example operation of a network that is tested using the switchable loopback mechanism.
Figure 3B:
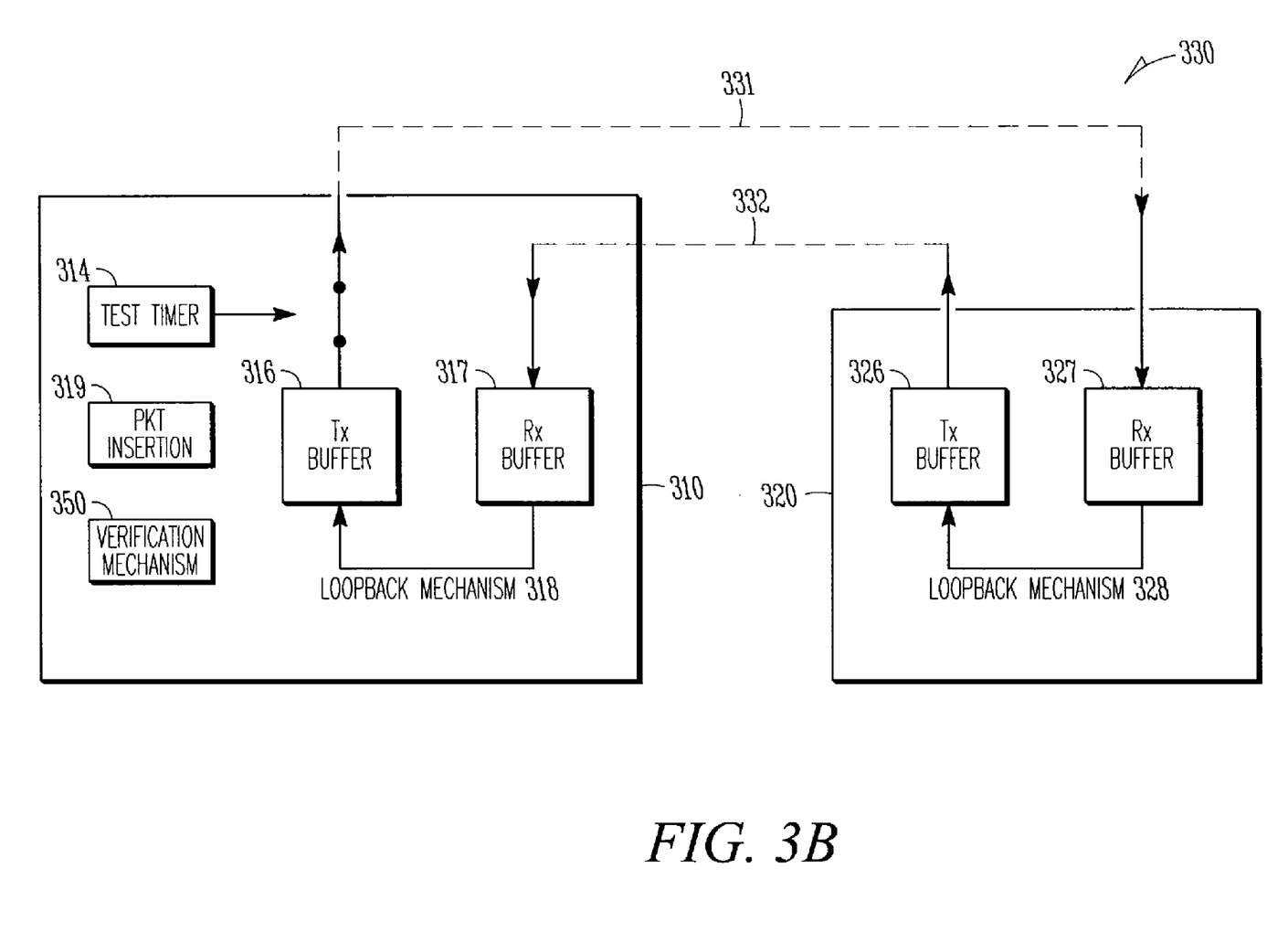
Figure 3C:
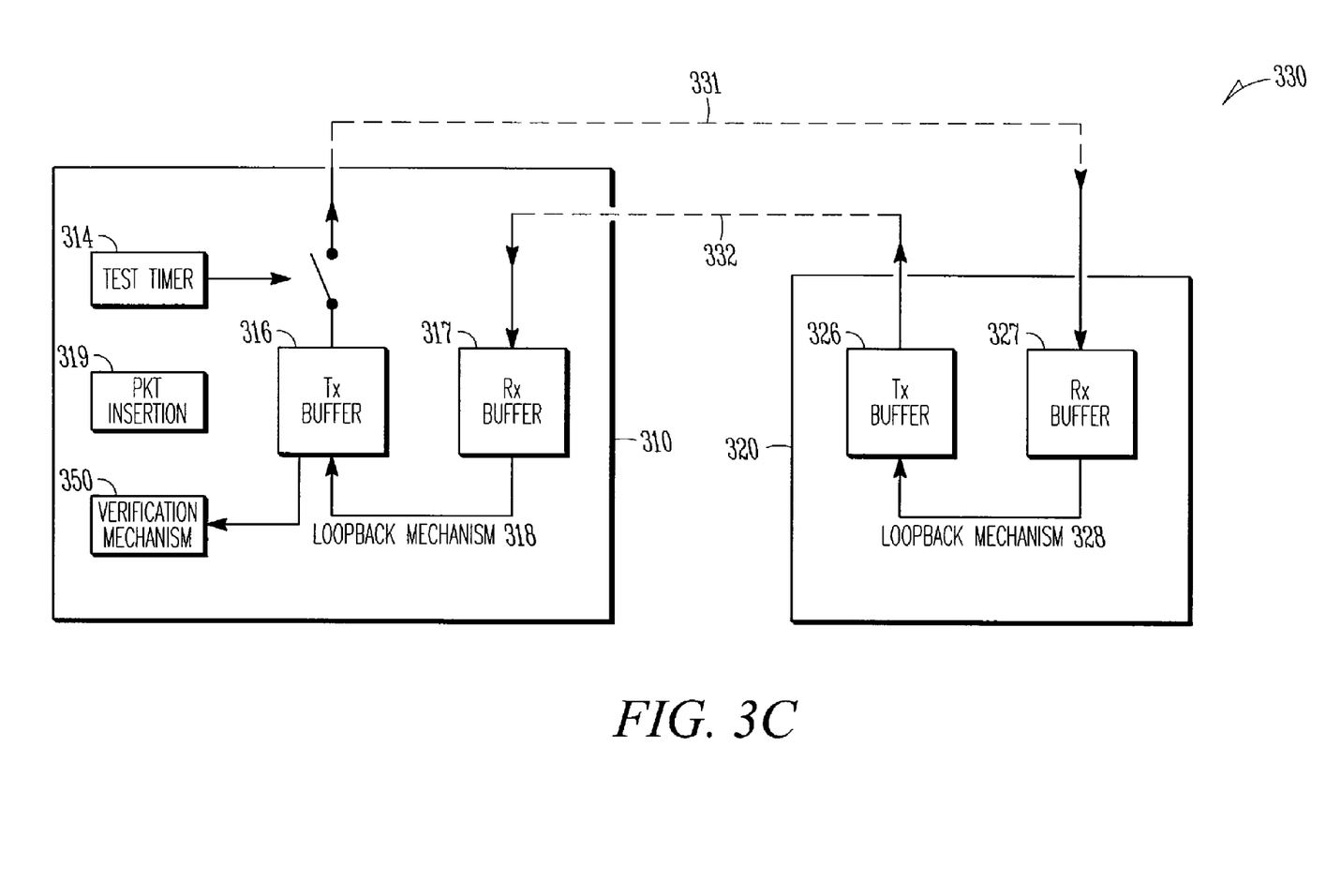

FIGS. 3A, 3B, and 3C show an example of packet flow through a network 330 during testing for network connectivity (e.g., fiber connectivity). As shown in FIG. 3A, a router 310, which is a local network device, is placed in a loopback mode by connecting a reception buffer 317 to a transmission buffer 316 using a loopback mechanism 318. Initially, the transmission buffer 316 is disconnected from the network 330 by a test timer module 314. Test data (e.g., a fixed data set of testing packets) are loaded into the transmission buffer 316 from the packet insertion mechanism (or injection module) 319.

To begin the testing in an example embodiment, the test timer module 314 connects the transmission buffer 316 to the network 330 for a specified amount of time (time period) as shown in FIG. 3B. The transmission buffer 316 sends the example fixed data set of test packets onto a transmission path 331 of the network 330 to a remote network device, such as router 320. The fixed data set of test packets that are received by router 320 are stored in a reception buffer 327. The router 320, which is also in loopback mode, sends the fixed data set of test packets from the reception buffer 327 to transmission buffer 326 using a loopback mechanism 328. The fixed data set of test packets in the transmission buffer 326 are then sent back to the reception buffer 317 of the router 310 over a packet receive path 332 of the network 330. The fixed data set of test packets from the reception buffer 317 are loaded into the transmission buffer 316 through the loopback mechanism 318, and are sent back to the router 320.

The fixed data set of test packets continue to cycle or loop through the routers 310, 320 over the network 330 until, as shown in FIG. 3C, the test timer module 314 disconnects the transmission buffer 316 from the network 330, so that the transmission buffer 316 operates as an extraction module to extract the fixed data set of test packets from the loop. The fixed data set of testing packets continues to flow from the router 320 until the buffers 326 and 327 are empty. The reception buffer 317 sends the fixed data set of test packets to the transmission buffer 316. After the buffers 326, 327, and 317 are empty, the fixed data set of test packets that are stored in buffer 316 are analyzed to determine the performance of the network connection. As the data flow ceases, the transmission buffer 316 forwards the fixed data set of test packets to a processing module or test verification mechanism 350. The network connection can be verified by detecting dropped packets and corrupted data using the processing module or test verification mechanism 350. For example, if the fixed data set of test packets contains a number of bit parity inline errors that exceed a threshold amount of errors, then the test for connectivity (e.g., fiber connectivity) may be considered as having failed. The reception buffer 317 can be used for capturing spurious data which has leaked into the data path from another source, causing the received fixed data set of packets to be larger than the originally injected fixed data set, or it can be used for extending the size of the injected fixed data set of test packets before starting transmission.

As shown in FIGS. 3A, 3B, and 3C, the apparatus may test network connectivity between two ports in geographically separated routers in a network. In an example embodiment the testing method utilizes flow controllable buffers 316, 317, 326, and 327, and switchable loopback mechanisms or apparatus/device 318 and 328 in a data traffic path of network 330 to implement a relatively inexpensive line rate test of the down stream traffic path.

In an example embodiment, the entire system need not participate in the test. For example, two dedicated cards or media adapters one on a sender box and one on a receiver box may participate in the test while the rest of the box continue to send regular traffic. In this example embodiment, these two example test cards may participate in the diagnostic test and do not support regular traffic. After completion of the test these dedicated cards may then process regular traffic flow (e.g., after initialization). The whole path including the physical connection may be tested and the test may be done at the very bottom layer where the core data content doesn't change while it flows from one card or module to other.

Packets utilized in the test may be programmed by software or be provided in dedicated hardware (where packet content will have less flexibility). It will be appreciated that the packets do not need to have any meaningful data content but the content of the sent packet (test data) may not be modified. In an example embodiment, headers and Cyclic Redundancy Checks (CRCs) can be added to the original packets but are removed once the packet reaches the destination and can be added again when leaving the sender port of the other card in the loopback path. The packet need not have any loopback indicator bit or field as the path may be defined so as to loop the packet back. It will be noted that, as long as any intermediate nodes between a sending node and a loopback node can transmit the packets without modification, the test can be used over multiple nodes in a row in the path.

In an example embodiment when a small delay occurs in sending a packet and then receiving the same packet from a loopback node, all sent packets may need to be returned to the sender node in order to verify path quality. In case of smaller distances all the test packets may be buffered in memory and may be checked for an exact match. For example, a CRC error counter, parity error counters, and/or bit inline parity error counters may be checked. If the entire path is working at an advertised rate there may not be a single error in the packet content. However, if the path is problematic (e.g., not clean or can't sustain the advertised rate because of faulty hardware) packets may be truncated and eventually missing from the test data. Error types that may arise, and thus be identified by the test, include CRC errors, parity errors, an error because of an under run, an error because of an overflow, a dirty fiber connection, or the like.

For a long path, when the delay between sending a packet and receiving it, is not small, the transmitter may retransmit the content of the transmit buffer 316, until the path is saturated. During the test, statistics may be gathered to determine the total number of packets transmitted and the total number of packets received. After the loopback test there may only be room to sample a smaller subset of the returning packets in the transmit buffer 316. In order to verify the path quality, the counters for transmitted and received packets should match. Since the smaller subset of the transmitted data that is sampled at the end of the test may not give a definite verification of the path quality, this mode of test may be more dependent on various error counters in order to establish the path quality, than what is required for the short path. Error counters to check and error types may be the same as for the short path.

In the event of the test failing for the loopback path, software may read remote debug and error counters, e.g. in the network device 320, and compare them to debug and error counters in the local node 310, in order to narrow down the exact cause and/or location of the failure.

The duration of the test may be an input argument to the program and the test may run from few seconds to several days depending on the necessity. For close distances or short loop paths, all the test packets may be captured at the end of the test.

Figure 4:
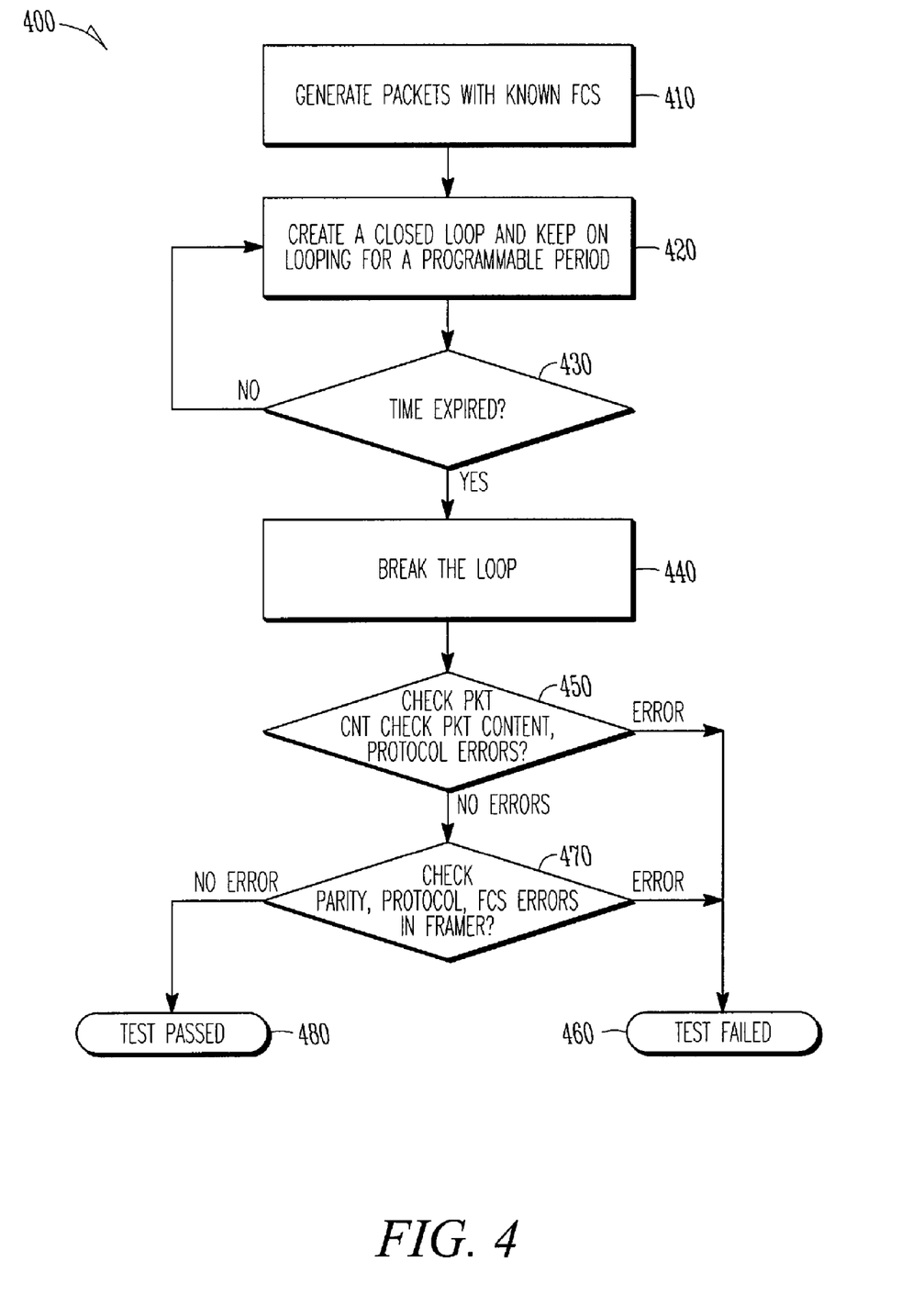
FIG. 4 shows a method, in accordance with an example embodiment, of performing network testing using a switchable loopback mechanism.

FIG. 4 shows a method 400, in accordance with an example embodiment, for performing testing of connectivity in network. The method 400 may test connectivity using a switchable loopback mechanism in first and second routing devices (e.g., the example routers 110 and 120 shown in FIG. 1). At block 410, test packets with a known Frame Check Sequence (FCS) are generated at the first routing device. Thereafter, at block 420, switchable loopback mechanisms in the first and the second routing devices are closed to create a closed loop in the network. The test packets are looped through the network, from the first routing device to the second routing device and back to the first routing device until a predetermined or specified time period expires (see decision block 430). After the time period has expired, and as shown at block 440, the loop may be broken and the test packets in the packet transmission buffer 216 are processed. At decision block 450 analysis of the packets may take place. For example, the content and protocol of the test packets may be checked to determine whether errors are present, and if errors are present, whether the number of errors exceeds a threshold amount. If so, at block 460 the method 400 may indicate that the network has failed the test for network connectivity (e.g., fiber connectivity). Otherwise, at block 470, the parity, protocol, and FCS may be examined to determine whether errors (e.g., bit inline parity errors) are in the framer of the test packets. If so, then the method 400 may indicate that the network has failed the test for connectivity (see block 460). However, if the network has not failed the test for connectivity, the method 400 may indicate that the network has passed the test for connectivity as shown at 480.

With the method 400 and device/mechanism 218, 228 and 318, 328 described by way of example herein, during installation of networking equipment over long distances, the connectivity of a transmission medium such as fiber optic cable may be tested. In an embodiment, the method 400 may independently test connectivity and identify errors, such as bit inline parity errors, of distant framers or routers at a given line rate using a packet insertion device. In an example embodiment, two port adaptors (or media adaptors), one local and one distant, are configured in a closed loop. One of the port adaptors may include a packet insertion mechanism/module that acts as a bit blaster by generating data packets for a fixed period of time. The generated data packets circulate between the two port adaptors in the closed loop. After the packet insertion mechanism stops inserting packets into the network, the loop can be opened. Packets received back at the port adaptor with the packet insertion mechanism can be examined for errors (e.g., parity errors or other errors) to check network connectivity. The method 400 and mechanism/devices 218, 228 and 318, 328 can be implemented in the port adaptor of a router.

It is also to be appreciated that the methodology described herein may also be used with a simple loopback (e.g., fiber loopback) to test a router (e.g., the routers 110 and 120). In an example embodiment, the packet source path (or transmit path) 131 and a packet return path (or receive path) 132 may be directly coupled so that data is looped directly from the packet transmission buffer 216 to the packet reception buffer 217 without being sent to a downstream device (e.g., the router 120). This configuration may facilitate design verification, manufacturing tests and/or field test of the physical interface 214 as well as connectivity between the physical interface 214 and the port adapter chip 215.

Figure 5:
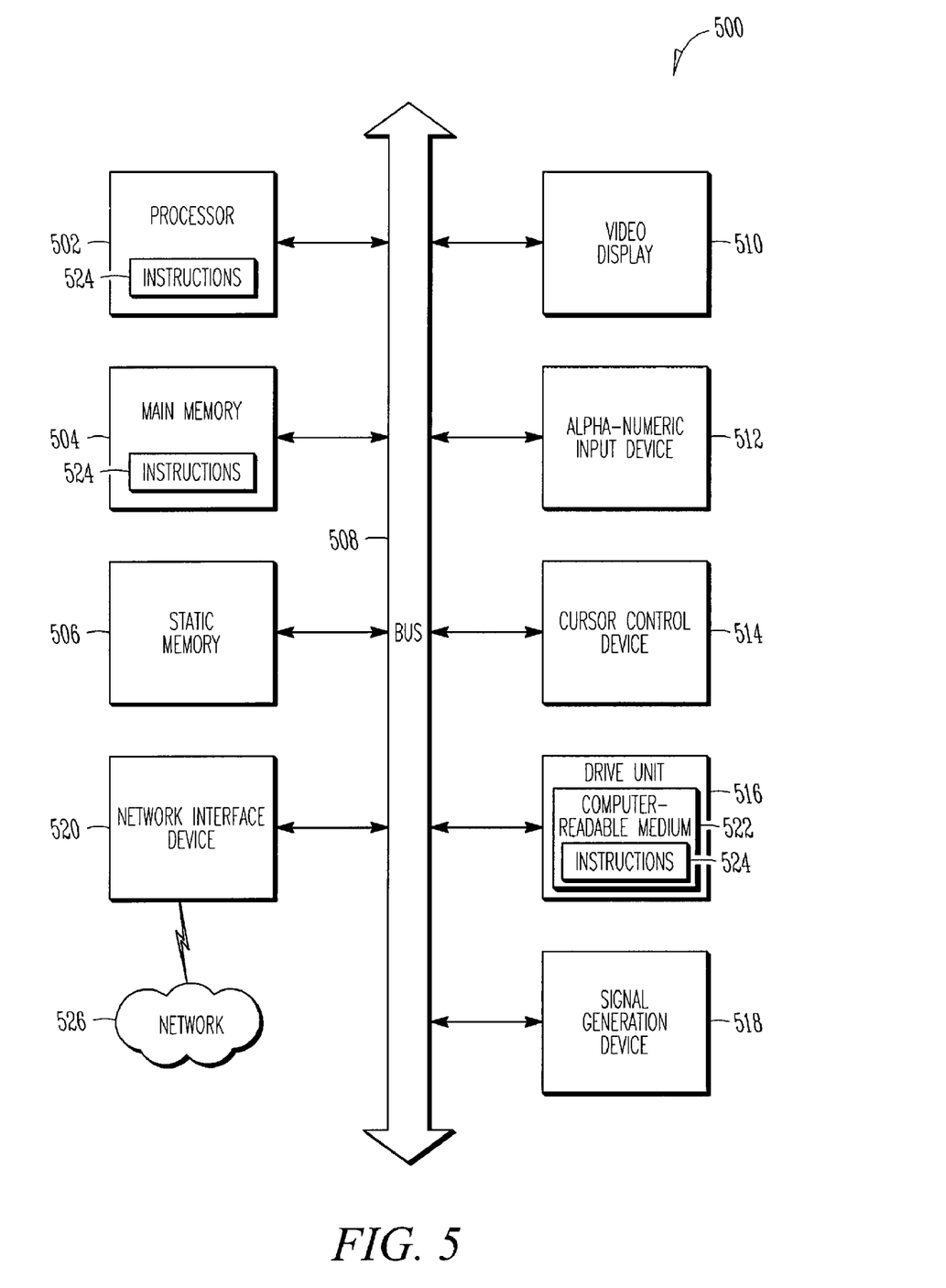
FIG. 5 shows a diagrammatic representation of a machine in the example form of a computer system within which a set of instructions, for causing the machine to perform any one or more of the methodologies discussed herein, may be executed.

FIG. 5 shows a diagrammatic representation of machine in the example form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (e.g., HTTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method for testing a data path in a network, the method comprising:
    creating a closed loop in the data path with a first loopback mechanism at a local network device and a second loopback mechanism at a downstream network device so that a fixed set of test data sent from a first port adapter of the local network device to a second port adapter of the downstream network device is returned by the downstream network device, the first port adapter comprising a first packet transmission buffer and a first packet reception buffer, the second port adapter comprising a second packet transmission buffer and a second packet reception buffer;
    connecting the first packet transmission buffer to the first packet reception buffer with the first loopback mechanism at the local network device;
    connecting the second packet transmission buffer to the second packet reception buffer with the second loopback mechanism at the downstream network device;
    injecting the test data into the closed loop at the first packet transmission buffer of the first port adapter of the local network device;
    repeating, at the local network device, the steps of receiving the test data returned by the downstream network device and re-injecting the received test data back into the closed loop for a test duration, the repeating to accumulate transmission errors in the test data;
    extracting the test data from the closed loop; and
    analyzing the test data.

2. The method of claim 1, which comprises analyzing the test data to identify a data communication rate in the data path.

3. The method of claim 1, which comprises providing the test data to the data path independently of a network processor of the local network device.

4. The method of claim 3, which comprises:
    storing the test data in a sender module that provides data to the data path;
    injecting the test data into the closed loop directly from the sender module; and
    selectively extracting the test data from the loop directly into a receiver module.

5. The method of claim 1, wherein the test data is a fixed set of known data.

6. The method of claim 5, wherein creating the closed loop comprises:
    closing a first loopback mechanism at the local network device; and
    closing a second loopback mechanism at the downstream network device.

7. The method of claim 6, further comprising:
    looping the fixed set of test data in the closed loop for a specified time period.

8. The method of claim 6, further comprising:
    opening the first and second loopback mechanisms after the specified time period expires.

9. The method of claim 1, wherein selectively extracting comprises:
    storing the test data received from the downstream device in memory at the local network device.

10. The method of claim 9, wherein analyzing the test data comprises:
    reading the test data from the memory; and
    processing the test data to identify errors in the fixed set of test data.

11. The method of claim 10, further comprising:
    determining whether the identified errors exceed a threshold number of errors.

12. The method of claim 11, further comprising:
    determining that a fiber connectivity of the data path has failed the test if the identified errors exceed the threshold.

13. An apparatus to test a data path in a network, the apparatus comprising:
    a first loopback mechanism at a local network device and a second loopback mechanism at a downstream network device configured to create a closed loop in the data path so that a fixed set of test data sent from a first port adapter of the local network device to a second port adapter of the downstream network device is returned by the downstream network device for a test duration, the first port adapter comprising a first packet transmission buffer and a first packet reception buffer, the second port adapter comprising a second packet transmission buffer and a second packet reception buffer, the first loopback mechanism connecting the first packet transmission buffer to the first packet reception buffer, the second loopback mechanism connecting the second packet transmission buffer to the second packet reception buffer;

an injection module configured to
  inject the test data into the closed loop at the first packet transmission buffer of the first port adapter of the local network device, and
  repeatedly receive the test data returned by the downstream network device, and re-inject the received test data back into the closed loop for a test duration to accumulate transmission errors in the test data;
an extraction module configured to selectively extract the test data from the closed loop; and
a processing module configured to analyze the fixed set of test data.

14. The apparatus of claim 13, wherein analyzing the test data identifies a data communication rate in the data path.

15. The apparatus of claim 13, wherein the test data is provided to the data path independently of a network processor of the local network device.

16. The apparatus of claim 15, wherein:
the test data is stored in a sender module that provides data to the data path;
the test data is injected into the closed loop directly from the sender module; and
the test data is selectively extracted from the loop directly into a receiver module.

17. The apparatus of claim 16, further comprising:
a timer module to loop the fixed set of test data in the closed loop for a specified time period.

18. The apparatus of claim 17, wherein the loopback mechanism is configured to open after the specified time period expires.

19. The apparatus of claim 16, wherein the extraction module stores a fixed set of test data in memory of the local network device.

20. The apparatus of claim 16, wherein the processing module is configured to identify errors in the fixed set of test data.

21. The apparatus of claim 16, wherein the processing module is configured to identify bit parity inline errors.

22. The apparatus of claim 16, wherein the processing module is configured to determine whether the identified errors exceed a threshold number of errors.

23. The apparatus of claim 22, wherein the network fails a connectivity test if the identified errors exceed the threshold number of errors.

24. A routing device comprising:
a packet reception buffer of a port adapter to receive packets from a network;
a packet transmission buffer of the port adapter to transmit packets over the network;
a test packet insertion module in the port adapter to insert a fixed set of test packets at the packet reception buffer into the network; and
a first loopback mechanism to cause accumulation of transmission errors in the test data by connecting the packet reception buffer and the packet transmission buffer so that the fixed set of test packets received by the packet reception buffer from the network are sent to the packet transmission buffer to be repetitively re-inserted in a closed loop in the network for a test duration, the closed loop created with the first loopback mechanism and a second loopback mechanism at a downstream network device.

25. The routing device of claim 24, further comprising:
a timer module to cause the first loopback mechanism to disconnect the packet reception buffer and the packet transmission buffer after a specified time period has expired.

* * * * *